: 2,741,577
Patented Apr. 10, 1956

2,741,577
MICROBIOLOGICAL OXIDATION OF IDONIC ACID TO 2-KETO-l-GULONIC ACID

Richard N. Shoemaker, Huntington Station, N. Y., assignor to Chas. Pfizer & Co., Inc., New York, N. Y., a corporation of Delaware No Drawing. Application April 26, 1954,
Serial No. 425,715

3 Claims. (Cl. 195—30)

This invention concerns a process for the preparation of 2-keto-1-gulonic acid. More specifically, it is concerned with the preparation of this compound by subjecting l-idonic acid or a non-toxic l-idonate to the oxidizing system produced by *Micrococcus aurantiacus* when grown under aerobic conditions on an otherwise sterile nutrient medium.

The organism *Micrococcus aurantiacus* is described in Bergey's Manual of Determinative Bacteriology, 6th edition. Its cultural characteristics and standard test results are there described. A living culture of this organism has been deposited with the American Type Culture Collection in Washington, D. C., and given the number ATCC 11731.

2-keto-1-gulonic acid is a compound of great value. Illustrative of this value is the fact that the compound is an intermediate in the presently used commercial synthesis of ascorbic acid.

An object of this invention is the preparation of 2-keto-1-gulonic acid by subjecting idonic acid or a non-toxic idonate to the oxidizing system produced by *Micrococcus aurantiacus*. This object may be realized in any of several ways. For example, the organism may be grown under aerobic conditions on an otherwise sterile nutrient medium containing idonic acid or an idonate. Alternatively, to such a medium in which growth has been established, idonic acid or an idonate may be added. The reaction may also be carried out by subjecting idonic acid or an idonate to a suspension of cells so grown, or to a cell free broth in which the organism has been grown. The organism may also be grown on an otherwise sterile, solid or semi-solid nutrient medium, an extract of which will carry out the conversion. All of these procedures are included in the expression "subjecting to the oxidizing system produced by cultivating *Micrococcus aurantiacus* under aerobic conditions on an otherwise sterile nutrient medium."

The organism may readily be grown on standard nutrient media used for the cultivation and study of bacteria. For examples consult Bergey's Manual. For the purpose of preparing 2-keto-1-gulonic acid, however, it is desirable that the organism be grown on a nutrient medium which contains some idonic acid or an idonate. To illustrate, a liquid nutrient medium containing a source of carbohydrate such as dextrose, inorganic salts such as potassium phosphate and magnesium sulfate, a protein source such as peptone, growth promoting substances such as yeast extract, and idonic acid or a nontoxic idonate may be used. The term non-toxic idonate includes salts of metals, ammonia and amines which will not interfere with the metabolism of the organism, and esters of simple alcohols. A minimum of simple testing will readily show whether or not a particular idonate is toxic. After the organism has become acclimated to the medium, it is not necessary to include an accessory carbohydrate source such as the dextrose used in the above illustration.

When the organism has become established and adapted to the medium which contains no accessory carbohydrate source, it may be transferred daily into another such medium without loss of the ability to produce 2-keto-1-gulonic acid. If, however, the organism is allowed to remain in the same medium for periods of time in excess of about one day, dependent upon factors such as size of initial inoculum, fermentation temperature, fermentation pH, etc., the organism tends to reproduce itself in a form which is yellow in color and not conducive to carrying out this preparation. In this case, the desired end product, 2-keto-1-gulonic acid, will be itself oxidized. If, on the other hand, a daily transfer of the organism to fresh medium is accomplished, or if the 18–24 hour old cultures are refrigerated, the organism will propagate itself in the white or colorless form and successfully carry out the process. The behavior of the organism can be explained by postulating the appearance of a strain having the characteristic of a specific oxidizing system. This strain may be said to be of a recessive nature, and may be correlated morphologically with the white appearance of an otherwise chromogenic species. Growth of the organism on a medium containing idonic acid or an idonate tends to facilitate the propagation of a strain having the desired but recessive characteristics. These recessive characteristics become suppressed by the growth of the organism exhibiting the dominant yellow strain which is not suitable for the preparation of 2-keto-1-gulonic acid. Keeping the culture young is helpful in excluding the appearance of the yellow strain which will oxidize the 2-keto-1-gulonic acid.

A method of carrying out the preparation of 2-keto-1-gulonic acid is illustrated by the following outline of such a procedure. A liquid nutrient medium containing inorganic salts and a source of nitrogen is charged with sodium-1-idonate in an amount which may be up as high as 30%, although this is not a critical limit. This medium is inoculated with a liquid, idonate containing broth in which the organism has been growing for about 24 hours. The volume of this broth inoculum may conveniently vary between 1 and 20% of the total mixture volume, although these limits are not critical. The mixture is shaken under aerobic conditions at a temperature of between 25 and 40° C. The size of the inoculum determines the time necessary to carry out the reaction. If the inoculum is about 1% of the total volume, about 5 days will be required. If, on the other hand, the inoculum is about 20% of the total volume, about one day will be required.

It has been found that the progress of the reaction may be followed by means of a color test using orthophenylenediamine dihydrochloride. This reagent is thought to be specific for 2-keto-hexonic acids under the following conditions. It is used in a 2½% aqueous solution. A sample of the reaction mixture is diluted so that it contains from between 25 to 100 gamma of product per milliliter. A sample of this solution is then treated with the orthophenylenediamine dihydrochloride reagent, the reagent volume being about ½ that of the sample. The mixture is heated on a water bath for one-half hour. After cooling, the mixture is placed in a Beckman spectrometer, and readings are made at 330 mµ. A straight line relationship exists between the concentration of 2-keto-1-gulonic acid and the optical density of the sample line at this wave length.

Example

An aqueous nutrient medium was made up with the following composition:

| | Percent |
|---|---|
| Dextrose | 0.1 |
| Sodium-l-idonate | 2.0 |
| Monopotassium phosphate | 0.04 |
| Magnesium sulfate | 0.02 |
| Peptone | 0.5 |
| Yeast extract | 0.025 |
| pH 7.2 adjusted with sodium hydroxide | |

This medium was inoculated with a culture of *Micrococcus aurantiacus*. The organism was transferred daily to similar nutrient media from which the dextrose had been omitted. 10 cc. of such a dextrose free medium was then inoculated into 100 ml. of a similar medium which also may be dextrose free, containing 2% sodium-1-idonate. This mixture was maintained at 28° C. for 3 days. Aerobic conditions were maintained and shaking was carried on throughout. At the end of this time the 2-keto-1-gulonic acid was isolated by the following procedure:

The pH, which had risen to about 8.5, was brought down to about 4 by the addition of acetic acid. Sodium hydroxide was then added to bring the pH up to 7.5. This procedure is used to preclude the formation of ammonia salts, which might form from ammonia resulting from the metabolism of the nitrogen source. Methyl alcohol, in a quantity so that 70% of the total final volume is that of alcohol, was then added. A precipitate of sodium-2-keto-1-gulonic acid resulted. This precipitate was then filtered off. Treatment of the salt with a non-oxidizing strong acid such as hydrochloric yields the free acid.

There are many obvious embodiments of this invention. The foregoing example is given solely for the purpose of illustrating one possible embodiment. It is also to be understood that the theoretical discussion given above, while believed to be true, is given solely for the purpose of explanation, and that this invention is to be limited by the appended claims only.

What is claimed is:

1. A process for preparing 2-keto-1-gulonic acid, which process comprises subjecting to the oxidizing system produced by cultivating *Micrococcus aurantiacus* under aerobic conditions on an otherwise sterile, nutrient medium, a compound selected from the group consisting of 1-idonic acid and the non-toxic idonates.

2. A process for preparing 2-keto-1-gulonic acid, which process comprises subjecting a compound selected from the group consisting of 1-idonic acid and the non-toxic idonates to submerged, aerobic fermentation with the organism *Micrococcus aurantiacus*.

3. A process according to claim 2 wherein the starting compound is sodium 1-idonate and the organism is ATCC 11731.

References Cited in the file of this patent

UNITED STATES PATENTS

| 2,421,611 | Gray | June 3, 1947 |
| 2,421,612 | Gray | June 3, 1947 |

FOREIGN PATENTS

| 496,848 | Canada | Oct. 13, 1953 |